(No Model.) 3 Sheets—Sheet 1.
L. V. SONE.
VESSEL FOR TRANSPORTING LIQUID CARGOES IN BULK.
No. 326,344. Patented Sept. 15, 1885.
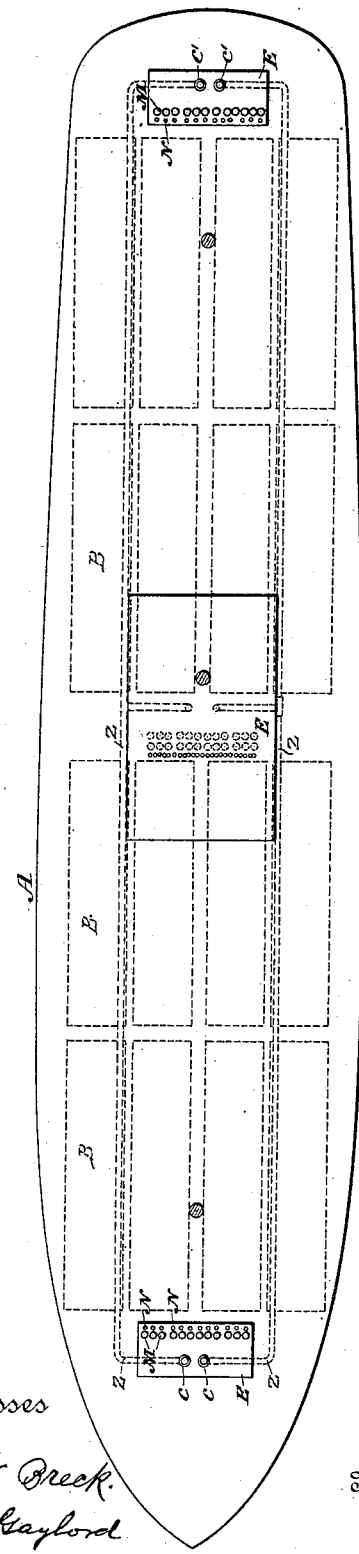
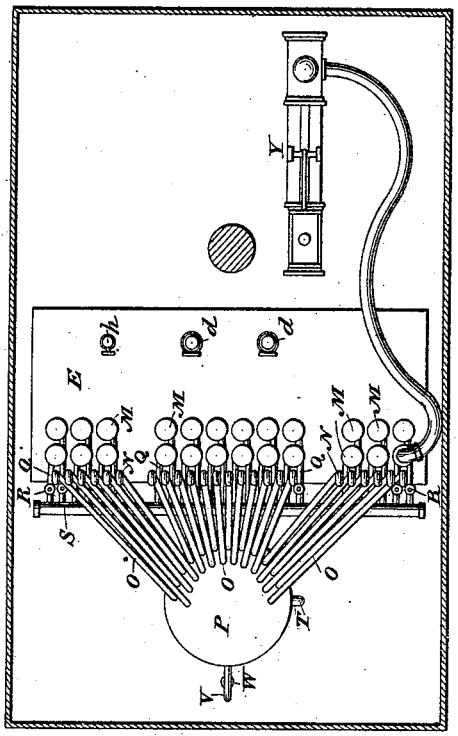
Witnesses
Geo. W. Breck.
R. F. Gaylord
Inventor
Louis V. Sone
By his Attorney
Paul A. Duncan
N. PETERS, Photo-Lithographer, Washington, D. C.

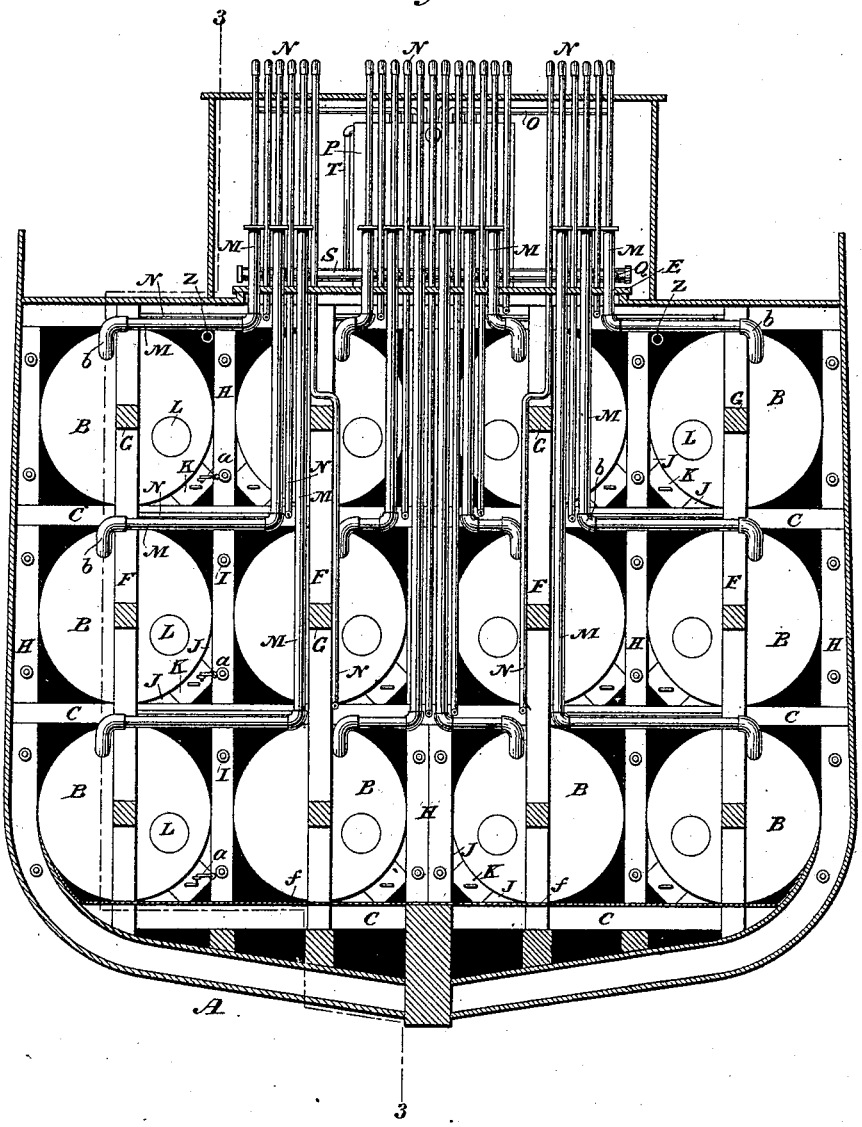

(No Model.) 3 Sheets—Sheet 3.
L. V. SONE.
VESSEL FOR TRANSPORTING LIQUID CARGOES IN BULK.
No. 326,344. Patented Sept. 15, 1885.
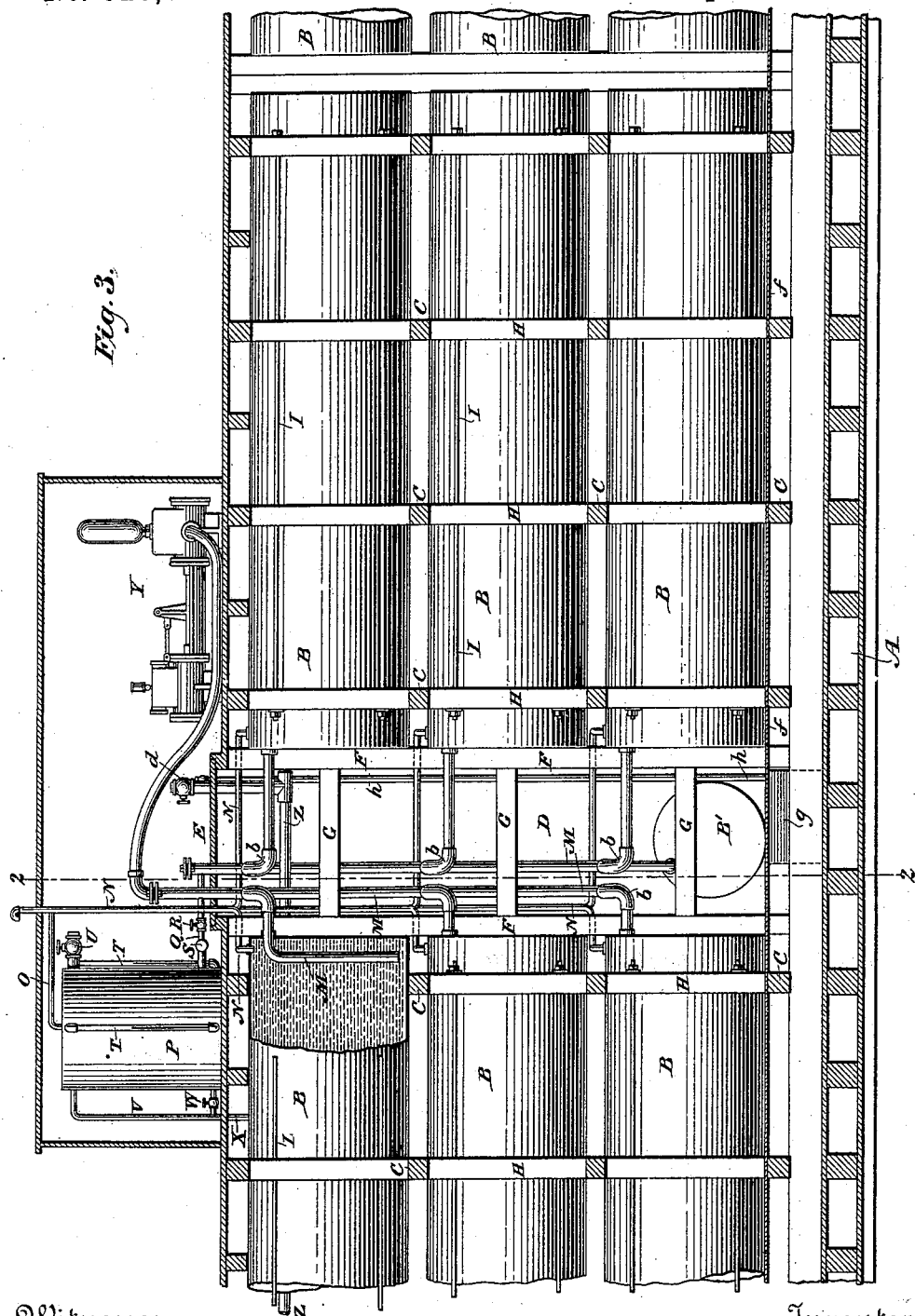

UNITED STATES PATENT OFFICE.

LOUIS V. SONE, OF NEW YORK, N. Y.

VESSEL FOR TRANSPORTING LIQUID CARGOES IN BULK.

SPECIFICATION forming part of Letters Patent No. 326,344, dated September 15, 1885.

Application filed June 12, 1885. (No model.)

*To all whom it may concern:*

Be it known that I, LOUIS V. SONE, a citizen of the United States, residing in the city, county, and State of New York, have invented certain new and useful Improvements in Vessels for Transporting Liquid Cargoes in Bulk; and I do hereby declare that the following is a full, clear, and exact description of the invention, which will enable others skilled in the art to which it appertains to make and use the same.

I am aware that heretofore descriptions have been given of vessels designed to carry liquid cargoes in bulk, and that in some cases Letters Patent have been granted for special constructions of such vessels. In all such constructions, however, the tanks designed to contain the liquid have had, so far as I am aware, their walls made continuous—that is, they were made substantially by inclosing the portion of the hull designed for this purpose by one continuous wall, and then subdividing such inclosed space into compartments by running partitions or septa through the main space and attaching them to the surrounding wall, whereby there were formed a number of tanks or cells, all of which were rigidly connected with each other, and each of which must be affected by any motion or movement which takes place in the main walls of any one of the set or number.

I consider such construction as impracticable for transporting liquid cargoes in rough water, for the reason that the tanks or cells are so rigidly attached to each other by walls which are common to all or many of them that the strain which must inevitably be brought upon them in rough water would rupture the walls or tear them from their fastenings and cause the tanks to leak, and the walls of the tanks are so related to each other that if one of them is emptied by being broken down or by leakage the walls of the adjoining tanks are weakened to such extent as to be unable to withstand the pressure, and the probable result will be the total loss of the cargo, if not of the vessel.

The object of my invention is to provide means for bringing the liquid cargo during its transportation in bulk so completely under the control of the crew of the vessel as to insure great security both to the cargo and the vessel, and thereby render it practicable to transport liquid cargoes in bulk with comparatively the same safety as if the liquid were placed in ordinary small packages, thus saving the cost of such small packages and the expense of handling and repairing them, as well as the extra time and labor necessary to load and unload the vessel.

I consider these two conditions essential to the successful accomplishment of the above-named object: first, that the main tanks shall be separate and independent of each other, so that no shock, strain, or absolute movement of one tank shall be imparted to, received, or sustained by any other of the series, as would be the case were the tanks constructed with walls common to several tanks, or were they otherwise rigidly connected; and, second, that the main tanks shall, under all ordinary circumstances during transportation, be kept entirely full, to prevent the constant swash and hammering of the liquid upon the walls of the tanks, which in rough water are liable to result in the speedy destruction of the tanks and in the consequent loss of the cargo and ship.

To this end my invention consists in part of a series of closed tanks or reservoirs, each separate or independent of the others, arranged within the hull of a vessel and so disposed in relation to each other and the hull that when loaded the vessel will be properly trimmed; also, of a series of separate and independent tanks arranged in such relation to each other within the hull of a vessel that substantially the entire surface of each tank can be readily inspected for leaks and can be reached for repairs; also, of a series of separate or independent tanks arranged within the hull of a vessel, each of which is provided with a supply and discharge pipe adapted to be connected to a pump and through which the individual tanks can be entirely filled and emptied, either in port or at sea, and can be supplied with liquid while in transit if at any time the tanks should become partially empty by reason of the contraction of the liquid under changes of temperature or by reason of leakage; also, of a series of separate and independent tanks arranged within the hull of a vessel, each of which is provided with a stand or pressure pipe constructed and arranged to keep the liquid in the tank under constant pressure, under ordinary conditions, and to permit the exit of any gas or vapor from the liquid in the tank; also, of an overflow tank raised above the plane of the main tanks and provided with an overflow-discharge adapted to be connected with one or more auxiliary tanks, in combination with stand or pressure pipes connected with the main tanks, whereby any expansion of the liquid in the main tanks may be received in the overflow-tank and conveyed to the auxiliary tanks; also, of a pressure tank raised above the plane of the main tanks and provided with an indicator, in combination with stand or pressure pipes and the supply and discharge pipes connected with the main tanks, whereby the condition of the contents of the main tanks can be readily ascertained and any deficiency of pressure be supplied; also, of a pump provided with means of connection with the supply and discharge pipes of the individual tanks arranged within a hull of a vessel, whereby the contents of any one of the tanks can be transferred to any empty or partially empty tank in case any tank shall spring a leak, or for the purpose of changing the trim of the vessel, and whereby the contents, or a part thereof, of any auxiliary tank may be pumped into any main tank to supply any diminution of its contents by reason of contraction thereof by variations of temperature or by reason of leakage, in order that the contents of the main tanks may be kept under constant and substantially uniform pressure; also, of means for attaching the various pipes to the tanks to give them the required flexibility to withstand the strains and shocks to which they may be subjected, the mechanical means adopted to secure the tanks in position, and to brace the gangways of the vessel, as well as the connections of the pipes with the pump-connections, and the construction and arrangement of various other minor parts, all substantially as hereinafter described and claimed.

My invention is illustrated in the accompanying drawings, which form a part of this specification, and in which—

Figure 1 is a plan view of the hull of a vessel. Fig. 2 is a cross-section of the same on the line 2 2 of Fig. 1. Fig. 3 is a longitudinal section of a part of the hull on the line 3 3 of Fig. 2. Fig. 4 is a plan or top view of the middle hatch, showing the grouping of the pipes and the pump.

In the drawings the various parts are designated by letters, and are referred to and described as follows:

A represents the hull of a sailing-vessel, which may be of either wood or iron, as desired, and in shape and general construction may be like the hulls of ordinary vessels.

B B are tanks or reservoirs, preferably cylindrical in shape, and made of plates of iron or steel firmly riveted or secured together by other means. I prefer the cylindrical shape for the tanks, as it gives greater strength than most other practical forms, and leaves no straight walls except at the ends of the tanks.

To give greater strength to the ends or heads, T-irons may be riveted upon the inner surface of the heads and the heads of each tank be connected to each other by rods of iron or steel running longitudinally through the tank, which rods, near the middle of the tank, are provided with a right and left hand screw, or other means by which the tension on the heads can be adjusted. The heads of the tanks may, if desired, be made conical, which shape would not only add materially to their strength, but would leave spaces between the heads of contiguous tanks, even when the bodies of the tanks were in contact, sufficient to enable the heads to be inspected for leaks, to be repaired, or to afford room for stand-pipes and other connections. The heads of the tanks might also be made concave, thus presenting an arch form against the pressure of the liquid.

While it is believed that iron or steel tanks are preferable in many respects to those of other materials, I do not limit my invention to such tanks, inasmuch as they may be made of wood, compressed paper, or other material. Neither do I limit my invention to tanks of any special shape or size, or number to be placed in the hold of the vessel, or to any special arrangement of the tanks relatively to each other, or to the walls of the hull, as these matters will depend largely upon the circumstances in any particular case—as the length, width, depth, and shape of the space available for the tanks—and whether the vessel is a sailing-vessel or a steamer. I prefer, however, in constructing a vessel for carrying liquid cargoes—like petroleum, naphtha, and kindred liquids—to fill the cargo-carrying space entirely with tanks for this purpose, as I do not consider it either advisable or practicable to employ such vessel for transporting mixed or general cargoes. I also prefer that the tanks should be firmly secured to the timbering of the vessel, and that their ends should be in contact with strong abutments, so that they will be prevented from moving in a fore-and-aft direction. I prefer, also, to have two classes or kinds of tanks—one kind to include the most of the tanks used, being those designated herein as main tanks, and which, under ordinary circumstances, are to be kept full and under pressure, and the other class designated as auxiliary tanks, which need be few in number, and may be of smaller size than the main tanks, and which may be entirely or partly empty. I prefer to make the main tanks for vessels of ordinary size, about thirty feet long, and from five to ten feet in diameter, the shape being cylindrical, and to place them longitudinally of the vessel—that is, so that the long axis of the tanks will be in the direction of the length of the vessel. I prefer to make the auxiliary tanks B' of small size, and to locate them in such parts of the vessel as cannot well be occupied by the main tanks—as, for instance, on the floor of the hull under the main tanks and in the gangways, in which latter case they may be located athwart the hull, and in any other parts of the hull which may be available. These tanks should be made strong enough to withstand the swash of their contents when only partly filled, and this can easily be done, since by reason of their small size the shocks and strains to which they will be subjected will be comparatively slight.

The accompanying drawings show the hull of a sailing-vessel and the arrangement, supports, and fastenings of the tanks therein; also, the arrangement of the tanks and their pipes relatively to the hatches of the vessel, the location of the pump and its connections relatively to the supply and discharge pipes of the several tanks, the location of the pressure-tanks and their relation to the various stand-pipes, as well as various other features of construction and arrangement, which will be pointed out as they are fully described hereinafter. This hold contains a series of forty-eight main tanks, B B, each about twenty-five feet long and six feet in diameter. These tanks, as will be seen in Figs. 1 and 2 of the drawings, are in four sets, each containing twelve tanks, arranged three tiers in height, and four tanks in each tier. The tanks are supported by strong timbers, C C, extending across the vessel, and are held in position so as to be immovable by means hereinafter described.

Figure 1 of the drawings shows three gangways, D D, and three hatches, E E. The center gangway is located between the two middle sets of tanks, and the forward and aft gangways are located, respectively, forward and aft of the other two sets of tanks, as seen in the drawings. In some constructions it may be preferred to locate the aft hatch and gangway directly forward of the aft set of tanks, and thereby afford room for a house and cabin upon the aft part of the deck.

The several tanks are held in a fixed position, so as to prevent both a fore-and-aft or a cross-movement, by the following means: Upright timbers F F, securely fastened to the cross-beams C C, are brought into close contact with the heads or ends of each tank, and furnish an abutment to prevent any fore-and-aft movement of the tanks. These timbers are preferably braced, by cross-pieces G G, extending across the gangways. The tanks are secured from any sidewise or rolling movement by sets of supplemental timbers H H, surrounding each tank and secured to the cross-beams of the hull. I prefer four sets for each tank, one near each end and two intermediate. These timbers may be held in position by means of rods I I, passing through them in the direction of the length of the tanks, as shown in Fig. 3. As additional means of preventing the rolling or side movement of the tanks, chocks J J, of either iron or wood, are forced between the timbers H and the body of the tank, the bearing-surface of the chocks being shaped to conform to the surface of the tank and timbers. These chocks may be held in position by bolts or pins passing into the timbers. K is an additional support, which may be used in connection with the chocks J J, and is preferably made of wood, and constructed to be removable, so as to permit a man to pass between the tank and the timber H in order to inspect or repair the tank. It may be held in position by a latch, a, hung to the timber H, or in any other convenient way. The chocks J J and support K may be used with each set of timbers H H, and thereby give the desired support to the tank and hold it against any cross or rolling movement. These chocks are seen in Fig. 2 of the drawings.

It will be seen that the timbers F F cover only the central or middle portion of the heads of the tanks, leaving the remainder uncovered for inspection at all times; also, that the arrangement of the bodies of the tanks and the surrounding timbering is such that a man can pass over and under each tank and thoroughly inspect almost every part of its outer surface throughout its entire length.

Each of the main tanks is provided with a man-hole, L, in one of its heads, which is placed out of the central line thereof to be free from the central abutment. The man-hole may be of the usual construction.

Each tank is also provided with a supply and discharge pipe, M, which is a pipe through which the tank can be filled with liquid and through which the liquid can be drawn or discharged from the tank. One of the ends or heads of each tank is preferably, as shown in the drawings, contiguous to one of the gang-ways D, and the pipes M are introduced into those heads near their tops, and are extended downward within the tank to the bottom thereof. The pipes M as they leave the tanks are carried outward from the head to pass the abutments, then upward a short distance, then toward the middle line of the vessel under the hatch, and then upward through the hatch, where they are grouped, and at a convenient height above the deck are provided with stop-cocks or other means for closing them, and with means for attaching a hose or pipe to be connected with a pump to be hereinafter referred to. The bends in these pipes near the heads of their respective tanks are seen in Figs. 2 and 3 of the drawings, and are formed by elbows b, which give to the pipes sufficient flexibility to prevent them from being broken under any ordinary strains to which they may be subjected. These pipes should be about four or five inches in diameter to give them the desired capacity.

Each of the tanks B B is also provided with a pressure or stand pipe, N, which pipes are connected with the tops of the tanks near the supply and discharge pipes, and following substantially the direction of the supply and discharge pipes pass out of the hatches, and then rise sufficiently above the deck to discharge the gas and vapor at a height where it will not cause inconvenience or discomfort to the crew. These pipes may be grouped together and supported in their elevation above the deck by attachment to the masts or to some other rising support. These pipes are of course to be left open under all circumstances.

At a convenient height above the deck each of the pipes N is provided with a branch, O, which enters a tank, P, located on or above the deck and at a higher plane than the tanks B B.

The tank P is designed to operate as a pressure-tank—that is, a tank to contain a supply of liquid which can at any time be used to keep the liquid in the tanks B B under constant pressure by drawing its contents, or such portion thereof as may be necessary for this purpose, into the pipes M or N, preferably, for the reasons hereinafter stated, into the former. To that end each of the pipes M is connected with the tank P by a connecting-pipe, Q, which is provided with a stop-cock, R, which enters the tank P near its bottom. A convenient way of making these connections is through a common pipe, S, as seen in Fig. 3 of the drawings. This tank P is provided with an indicator, T, by means of which it can be readily ascertained whether the contents of the tanks B B are under the desired pressure. The tank P is preferably connected directly with the supply and discharge pipes M, rather than with the pressure or stand pipes N, for the reason that while the liquid is passing down the pipes M the pipes N being open at their upper ends, furnish a complete vent for the escape of air or gas, while if the connections were made with the pipes N directly, the pipes M being closed at their upper ends, all of the air and gas in the tanks would have to be forced out of the same pipes N, down which the liquid descends, and this might cause obstruction or delay to its descent. By making connections directly with the pipes M a free descent of the liquid through the pipes M, and a free ascent of the gas and air through the pipes N are obtained. While this is considered to be the better connection, it is believed to be practical to connect the pressure-tank directly with the pipes N. The tank P is also connected with a pump, preferably a hand-pump, by which it is supplied with liquid from time to time as may be necessary.

U represents a pipe adapted to be connected to a pump conveniently located upon the deck and adapted to be connected to draw liquid from the auxiliary tanks or the main tanks.

The operation of the tank P and its indicator T, in combination with the pipes M, will be more fully explained hereinafter.

The tank P is also designed for an overflow-tank, whenever the conditions of transportation require its use for that purpose, and to this end it is constructed with a discharge-pipe, V, near its top, which will prevent its contents from filling above such level, and a discharge-cock, W, near its bottom, by which it can be entirely emptied. These may lead into a common pipe, X, below the discharge-cock W, and be connected with any of the main or auxiliary tanks, as desired.

It is here observed that in the arrangement of tanks shown in the drawings the pipes M and N of the two middle sets of tanks, twenty-four in number, pass up through the middle hatch and are grouped upon deck near such hatch, where they—the tank P and the pumps—are preferably to be covered with a house, as shown in Fig. 3 of the drawings, the pipes N projecting through its roof. The pipes of the forward and aft set of tanks pass up through their respective hatches and are grouped together, and should be similarly protected. It is also designed to have a pressure and overflow tank like the tank P and connected with the pipes M as hereinbefore described, and shown in Fig. 3, at each group or bank of pipes M and N, which in the construction of the hull and the arrangement of tanks shown in the drawings will be above or near each of the three hatches.

It is also remarked that the auxiliary tanks are preferably furnished with supply and discharge pipes and with pressure-pipes substantially like the pipes M and N of the main tanks B B and for the same purposes—that is, for the purposes of filling and emptying them and for the purpose of putting and keeping their contents under pressure whenever this may become desirable.

Y represents a suction and force pump, which may be of the ordinary construction of such pumps. This pump, preferably, is centrally located in relation to the various sets of tanks, and in the construction shown in the drawings I prefer to locate it over or near the middle hatch. The suction and discharge of this pump are provided with connections which can be attached at will to any of the supply and discharge pipes of the main or auxiliary tanks or to some pipe which can be easily connected thereto. For convenience of connection with the several tanks, especially those at the fore and aft ends of the hull, two pipes, Z Z, are placed under the deck of the hull, each of which is provided with stop-cocks $c$ and $c'$ at its ends, and means for connecting a hose or pipe with the pipes M of the tanks. They are also provided with a stop-cock connection, $d$, near the pump for attaching them to the suction or to the discharge of the pump, as the case may be. The connection between the pipes M grouped near the middle hatch, and consequently near the pump, may be made directly with the pump by the use of a hose or flexible pipe provided with any suitable means of connection and without employing the pipes Z Z or either of them, and this may be done whether the connection is for suction or for discharge; but when it is desired to connect the farther set of tanks to the pump either for suction or discharge, or both, the connection is conveniently made through the pipe Z Z.

Having described the construction and arrangement of the tanks, and the means for securing them in position in the hull of a vessel, as well as the system of supply and discharge pipes and of pressure or stand pipes, and the pressure and overflow tanks, and the centrally-located pump and its connections, I will now briefly describe the use and operation of some of these parts in filling the tanks and keeping them under constant pressure, as well as in changing the contents of one or more tanks to others directly or from the auxiliary tanks to the main tanks through the pressure-tanks P.

Suppose the tanks to be empty, and that they are to be filled from reservoirs of liquid on the wharf or from lighters-alongside, the operation is as follows: A hose or pipe connected with the suction of the pump Y is also connected with the reservoirs, and the discharge of the pump is connected with one of the pipes Z Z through its connection $d$, while the aft end of the pipe Z is connected by a hose to one of the pipes M leading to one of the aft set of tanks. The cocks at $d$ and $c$ are now opened, the cock $c'$ being closed, and the liquid is drawn from the reservoir into the pump and forced through the pipe Z to any one of the aft set of tanks with which the pipe Z may be connected through its pipe M. Each tank of the aft and forward sets may be filled through one of the pipes Z by making the proper connections, which will be well understood without further explanation. The two middle sets of tanks are filled in substantially the same manner, except that the connection with their pipes M may be made directly with the discharge of the pump instead of through either of the pipes Z Z.

The several tanks may be emptied of their contents by simply reversing the operation by which they are filled, as above described—that is to say, to empty them, the suction of the pump is connected with the pipes M of the tanks, and the discharge connected with the receiver on wharf or on lighter.

In filling the several tanks the pressure or stand pipes N, which, as has been stated, are open at their upper ends at a considerable elevation above the deck, provide a free passage for the exit of all gas, air, and vapor which may be in the tanks, and this office they perform not only during the filling of the tanks, but at all times during the voyage. When the tanks are full, or nearly full, and before the pipes M connected therewith are full, it is proper to stop the filling operation and to close the ends of the pipes M in some secure manner, but in such way that connection can be readily made with the pump should occasion require during the voyage.

It is important that the tanks should not only be filled full, but that they should be kept full during the entire period of transportation; and to insure this their contents are placed under the pressure of a column of the same kind of liquid. While the liquid in this column can run down into the tanks to supply any diminution of their contents, the column itself can be maintained from outside sources, so as to keep the contents of the tanks under a constant and substantially-uniform pressure under all ordinary circumstances. This pressure is obtained and regulated as follows: The tanks having been filled, or nearly filled, as above described, the liquid is pumped into the pressure-tanks P either by a hand or power pump, as desired. The stop-cocks R are opened and the liquid runs down the pipes M, and is forced up the pipes N until it reaches the level of the liquid in the tank P. This will give a pressure upon the contents of each tank B which will vary with the height of the liquid in the pipes N. It is proposed to maintain substantially this pressure upon each tank during the voyage by supplying additional liquid to any tank by drawing from the pressure-tanks P through the pipes M as fast as its contents are diminished by contraction, evaporation, or leakage.

As is well understood, many kinds of liquid, especially petroleum, naphtha, and kindred liquids, are subject to considerable variation in bulk, both by expansion and contraction, due to changes of temperature, and in transporting such liquids proper provision should be made for both of these conditions. In the present construction the means provided for caring for the overflow from the expansion of the liquid is very simple in arrangement and is automatic in its operation. The tanks P, which, primarily, are pressure-tanks, serve also as overflow-tanks to receive any surplus of liquid from the expansion of the contents of the main tanks. As these tanks become filled the surplus runs from the discharge near the top of such tanks and passes into any auxiliary tank connected therewith.

In case the liquid in the tanks contracts, and its level in the pipes N and M falls, an additional quantity is supplied from the pressure-tanks P. This may be accomplished by leaving the stop-cocks R open during most of the time, always keeping a supply of liquid in the pressure-tanks, and in such case both the pipes N and M would act as pressure-pipes, and the pipes N would always, unless some serious leak occurred, be filled to the level of the liquid in the tanks P. Suppose the tanks and their pipes of any one set to be filled to the level of the liquid in the pressure-tank, and that this level, as shown by the indicator T, is, say, twenty inches, and that the stop-cocks R are open, allowing free communication from the tank P to the tanks B B. If the liquid maintains substantially this level, it may be safely concluded that there is neither contraction nor expansion to any considerable extent. If the level rises, as shown by the indicator, there is expansion of the liquid, and the overflow, if more than enough to fill the tank P, will be cared for as hereinbefore set forth. If, on the other hand, the level in the tank P, the cocks R being open, falls gradually, as shown by the indicator, it is an indication that the liquid in the tanks and pipes below is gradually contracting, and that more liquid should be supplied to the tank, which can be done, when only small quantities are required, by the use of a hand-pump connected with the auxiliary tanks. For convenience, a hand-pump should be located near each pressure-tank, to give the necessary supply, and thus generally obviate the use of the power-pump and the cost of fuel to drive it.

If it should appear by inspection of the indicators that the level in any of the tanks P is falling rapidly, it is an indication that some leak of importance has occurred which requires immediate attention. The first thing to to be done is to ascertain where such leak is, and to this end all the cocks R of the group of pipes under consideration should be closed and the tank P be filled to any desired level. The cooks R should then be opened one by one, and observations made of the indicator till the trouble is located, which will be when upon opening some cock the liquid is found to run rapidly from the pressure-tank. To facilitate the immediate location and inspection of any tank which may thus be ascertained to have sprung a leak, the stop-cock, its pipe M, and the tank with which it is connected should each be plainly marked with the same number or some other designating mark, and this should be the case with each stop-cock R, pipe M, and tank B of the entire series. A diagram showing the number or mark of each tank and its exact location should be made and kept convenient for inspection. This arrangement would enable the person in charge to go at once to any tank indicated by the behavior of the indicator and to ascertain what was the trouble and the extent thereof; and if it should be found necessary to pump out its contents it would also indicate the special pipe M to which the pump-connection should be made.

Instead of keeping the stop-cocks R open most of the time and closing them occasionally and then opening them one by one to ascertain the condition of the individual tanks, these stop-cocks may be kept closed most of the time, and in such case the inspection will be made by opening the cocks one by one and taking observations of the indicator for each cock. If the liquid rises in the tank P, it shows that the pipes of the main tank are filled above the level of the liquid in the tank P, and no further attention is at present required. If, however, the indicator shows that the liquid runs rapidly and continuously from the pressure-tank, this calls for immediate attention and inspection, which may be conducted in the manner heretofore described.

If the latter method of testing the condition of the contents of the tanks is practiced, the opening of the stop-cocks R should be quite frequent in order to detect any leaks in their early occurrence and in order to keep the pipes N well filled in case the liquid contracts.

Whenever the cocks R are opened, any diminution of the liquid in the tanks or the pipes N and M should be supplied from the tanks P, and the cocks should remain open sufficiently long for that purpose. Instead of using a pump to supply liquid to the tanks P, in order to secure the desired pressure upon the contents of the main tanks B B, these pressure-tanks may be fed from a series of auxiliary tanks placed above the main tanks and so arranged and connected as automatically to supply the pressure-tanks which may be connected with the main tanks as hereinbefore described.

If at any time it is desired to transfer the contents of any of the tanks B B to any empty tanks, either main or auxiliary tanks, for the purpose of trimming the vessel or saving the liquid in case of serious leakage, this can readily be done by connecting the suction of the pump to the pipe M of any tank to be emptied and connecting the discharge of the pump to the pipe M of any tank to be filled. For changing the contents of a tank in either the forward or the aft set of tanks to another tank of the same set, or for changing the contents of a tank in the forward set to a tank in the aft set, or vice versa, both of pipes Z Z are conveniently used by connecting one of the pipes Z with the suction of the pump and with the pipe M of the tank to be emptied, while the other pipe Z is connected with the discharge of the pump and with the pipe M of the tank to be filled. The connections of the pipes Z Z with the pump are made at the stop-cock connection d, and when the pumping takes place the stop-cocks at the unconnected ends of these pipes must be closed. It is also seen that in case it is desired to pump the contents of any of the tanks overboard, as in case of serious leakage, or to fill any empty tanks with water to trim the vessel or for ballast, either can be readily done by the use of the connections above described with the addition of a hose or flexible pipe attached to the discharge or suction of the pump, as the special purpose may require.

It is readily seen from the above description and from the drawings that each of the tanks B B forms a separate and independent structure, and is unconnected, either directly or through its pipes or fittings, with its adjacent tanks; also that the supply and discharge pipes of each tank, and the means of ascertaining the condition of the contents of each tank, and of supplying any diminution in such contents, are all upon the main deck, and are at all times accessible to those in charge. This is an important feature of construction in the transportation of certain kinds of liquids, (like crude petroleum and naphtha, for example,) which, when unconfined and in considerable quantities, give off gases or vapors that are injurious and often destructive to human life. By means of the appliances herein described it is practicable to transport cargoes of these liquids without descending into the hold of the vessel except when this is perfectly safe.

For instance, during a storm the hatches can be shut tight and covered, and if any of the tanks should spring serious leaks the particular one could be ascertained and its contents pumped into empty tanks or overboard, if necessary. If a tank should by any means be wrecked and its contents immediately discharged into the hull, this liquid could be pumped overboard in a short time, and all could be done without removing the hatches or exposing the men to injury.

It is desirable, but not essential, to provide a drip-pan to catch and retain any liquid which may leak from the tanks or from the deck in filling or emptying the tanks. Such pan may be conveniently placed over the lower tier of timbers which support the lower tanks, and may extend underneath the entire series of tanks. It should be provided with a well or depression, preferably under the middle hatch, which may be provided with a pipe adapted to be connected with the pump, by which the drip can be removed at any time, and pumped into empty tanks or overboard, as shall be desired. Such pan is preferably made of iron, lead, copper, or other metal, and is shown in the drawings, and designated by the letter $f$. The well is designated by $g$ and the pipe leading therefrom by $h$. This pan also in a large measure prevents the liquid from coming in contact with floor and timbers of the hull, by which such flooring and timbers, if of wood, would become saturated with the liquid, which, in many cases, is undesirable and in some injurious. The drip-pan and its well, connected with a pump, furnishes convenient means for testing the existence and extent of leakage which may occur in any of the tanks during such times as it would be unsafe to descend into the hold to make an actual inspection, as during a storm, when it is expedient to keep the hatches closed.

It is here observed that it is considered desirable to provide a certain quantity of stone or iron ballast, which may be stowed upon the floor of the hull beneath the timbers C C. A considerable proportion of ballast may be stowed in the gangways and any adjacent spaces thereto, and if by any accident the contents of one or more tanks should be lost the vessel may be trimmed by changing the ballast in the gangways.

The quantity of liquid to be carried from port in the auxiliary tanks will depend upon a variety of circumstances. For example, if the cargo is petroleum or similar liquid, and if the voyage is to be from a warm into a cooler temperature, the auxiliary tanks should be well filled, in order to have a supply to compensate for the contraction in the main tanks. If, on the other hand, the voyage is to be from a cool to a warmer temperature, and the cargo is such as will be expanded under such conditions, the auxiliary tanks should start empty, in order to be prepared to receive the overflow from the main tanks from expansion.

What is claimed as new is—

1. In combination with the hull of a vessel, a series of separate and independent storage-tanks, and a supply-pipe connecting to each tank.

2. In combination with the hull of a vessel, a series of independent storage-tanks inclosed therein, separate pipes communicating with said tanks, and an open frame-work supporting the tanks, substantially as described.

3. In combination with the hull of a vessel, a series of separate and independent tanks arranged therein, a supply-pipe for each tank, and a pump located near said pipes and constructed for convenient connection with any of the supply-pipes.

4. In combination with the hull of a vessel, a series of separate and independent tanks contained therein, and a stand-pipe connected to each tank.

5. In combination with the hull of a vessel, a series of independent tanks therein, a stand-pipe connected with each tank, and a pressure-reservoir common to a number of such pressure-pipes.

6. In combination with the hull of a vessel, a series of independent main tanks, an auxiliary tank or tanks, and pipe-connections to the auxiliary tank or tanks.

7. In combination with a series of main storage-tanks arranged within the hull of a vessel, a pressure-tank located above the level of the main tanks and provided with pipe-connections for discharging its contents into the main tanks.

8. In combination with the hull of a vessel, a series of main storage-tanks, an overflow-tank above the level thereof, with pipe-connections leading from such overflow-tank to the main tanks and to an auxiliary tank.

9. In combination with the hull of a vessel, a series of main storage-tanks, a pressure-tank above the level thereof, pipe-connections provided with stop-cocks leading from the pressure-tanks to the main tanks, and an indicator connected with the pressure-tank.

10. In combination with a series of independent storage-tanks in the hull of a vessel, pipes leading from a number of said tanks to a common radiating center, and an exhaust and force pump at such center adapted for connection with any two of the pipes.

11. In combination with the hull of a ship, a series of independent cylindrical tanks, a frame-work supporting said tanks in horizontal position, fixed chocks on the frame-work bearing against the tanks, and a movable chock interposed between the fixed chocks.

12. In combination with the hull of a ship, a series of tanks therein, a frame-work by which the tanks are held out of contact with each other, a pipe connecting to each tank, and an offset elbow in each pipe, (to give slight flexibility to said pipe,) substantially as described.

L. V. SONE.

Witnesses:
 DANIEL H. DRISCOLL,
 SAML. A. DUNCAN.